United States Patent [19]
Zocco et al.

[11] Patent Number: 5,799,366
[45] Date of Patent: Sep. 1, 1998

[54] LOCKING SWIVEL CASTER APPARATUS AND METHOD

[76] Inventors: Jay A. Zocco, 24 Croydon Ct., Wallingford, Conn. 06492; Robert F. Karas, 80 Charter Oak Dr., Cheshire, Conn. 06410

[21] Appl. No.: 740,436

[22] Filed: Oct. 29, 1996

[51] Int. Cl.⁶ .................................................. B60B 33/00
[52] U.S. Cl. .................................. 16/35 R; 16/DIG. 42
[58] Field of Search .............................. 16/35 R, 35 D, 16/DIG. 42

[56] References Cited

U.S. PATENT DOCUMENTS 1,671,774  5/1928  McIntosh ..................... 16/35 R

FOREIGN PATENT DOCUMENTS 2700991  8/1994  France ........................ 16/35 R
63-125404 5/1988  Japan ......................... 16/35 R
2211068  6/1989  United Kingdom ........... 16/35 R

*Primary Examiner*—Chuck Mah
*Assistant Examiner*—Donald M. Gurley

[57] ABSTRACT

A swivel caster method and apparatus including wheels rotatably coupled to a housing, wherein the wheels include a toothed cog on inner sides thereof. The housing is pivotally mounted to an article by a mounting stem having a keyed aperture. A brake lever bracket is pivotally coupled to the housing and includes a brake pin engageable with the toothed cog to prevent wheel movement relative to the housing. A swivel lever bracket is also pivotally coupled to the housing and includes a keyed shaft engageable with the keyed aperture of the mounting stem to prevent mounting stem movement relative to the housing. The brake pin of the brake lever bracket is engageable with the swivel lever bracket to pivot the swivel lever bracket to engage the keyed shaft with the keyed aperture when the brake pin is engaged with the toothed cog. A biasing member mounted to the housing is engageable with first and second sides of a cam member on the brake lever bracket to disengage the brake pin from the toothed cog and disengage the keyed shaft from the keyed aperture, and alternatively to engage the brake pin with the toothed cog and to engage the keyed shaft with the keyed aperture.

10 Claims, 1 Drawing Sheet

LOCKING SWIVEL CASTER APPARATUS AND METHOD

BACKGROUND OF THE INVENTION

The invention relates generally to locking swivel casters, and more particularly to locking swivel casters having wheels rotatably coupled to a housing pivotally coupled to a mounting stem, wherein the wheels are lockable to prevent rotation and the mounting stem is lockable to prevent swiveling of the wheels about an axis of the mounting stem.

A variety of articles including office chairs, strollers, shelf racks, furniture, machinery, and equipment stands are mounted on swivel casters to provide mobility and maneuverability of the article. Swivel casters include generally one or more wheels rotatably mounted to a housing pivotally coupled to a mounting stem, which is secured to the article by means known in the art. The mounting stem pivot axis is offset and at a substantially right angle relative to the wheel rotation axis to permit pivoting movement of the wheel about the axis of the mounting stem, which provides a high degree of maneuverability.

It is sometimes desirable in many applications to prevent the wheels from rotating and also to prevent the wheels from pivoting, or swiveling, about the axis of the mounting stem. It is known for example to provide a locking swivel caster with a locking device built into the mounting stem to prevent wheel rotation and to prevent pivoting action of the mounting stem. This prior art locking device is actuatable by a separate lever mechanism disposed on the article and separated from the swivel caster by some distance. A combination of rotatable shafts link the lever mechanism on the article with the locking device built into the mounting stem of the caster wherein the lever mechanism rotates the shafts, which in turn actuate the locking device. This particular locking caster arrangement thus requires that the article to which the locking caster is mounted be configured with additional components, which actuate the locking device. But these additional components require additional assembly including mounting on the article itself, which increases costs. In addition, these additional components may be mechanically incompatible with some articles, and aesthetic considerations may limit the extent to which this type of locking swivel caster can be applied on other articles.

In view of the discussion above among other considerations, there exists a demonstrated need for an advancement in the art of locking swivel casters.

It is therefore an object of the invention to provide a novel locking swivel caster apparatus and method that overcomes problems with the prior art.

It is also an object of the invention to provide a novel locking swivel caster apparatus and method that is economical.

It is another object of the invention to provide a novel locking swivel apparatus and method that is self contained and requires no additional parts or assembly wherein the swivel caster is readily mountable on most articles.

It is another object of the invention to provide a novel locking swivel caster apparatus and method with a lockable wheel and a lockable mounting stem actuatable by a common lock actuation lever.

The present invention is, accordingly, drawn to a locking swivel caster method and apparatus including one or more wheels rotatably coupled to a housing, wherein at least one wheel includes a toothed cog on an inner side of the wheel. The housing is pivotally mounted to an article by a mounting stem having a keyed aperture. A brake lever bracket is pivotally coupled to the housing and includes a brake pin engageable with the toothed cog to prevent wheel movement relative to the housing. A swivel lever bracket is also pivotally coupled to the housing, and the swivel lever bracket includes a keyed shaft engageable with the keyed aperture of the mounting stem to prevent mounting stem movement relative to the housing. According to the invention, the brake pin of the brake lever bracket is engageable with a slot in the swivel lever bracket to pivot the swivel lever bracket to engage the keyed shaft with the keyed aperture when the brake pin is engaged with the toothed cog. A biasing member mounted on the housing is engageable alternatively with first and second sides of a cam member on the brake lever bracket to pivotally urge the brake lever bracket into first and second positions. The biasing member is engagable with the first side of the cam member for pivoting the brake lever bracket to disengage the brake pin from the toothed cog wherein the brake pin pivots the swivel lever bracket to disengage the keyed shaft from the keyed aperture, and alternatively the biasing member is engagable with the second side of the cam member for pivoting the brake lever bracket to engage the brake pin with the toothed cog wherein the brake pin pivots the swivel lever bracket to engage the keyed shaft with the keyed aperture.

These and other objects, features and advantages of the present invention will become more fully apparent upon consideration of the following Detailed Description of the Invention with the accompanying Drawings, which may be disproportionate for ease of understanding, wherein like structure and steps are referenced by corresponding numerals and indicators.

DETAILED DESCRIPTION OF THE INVENTION

Figure 1:
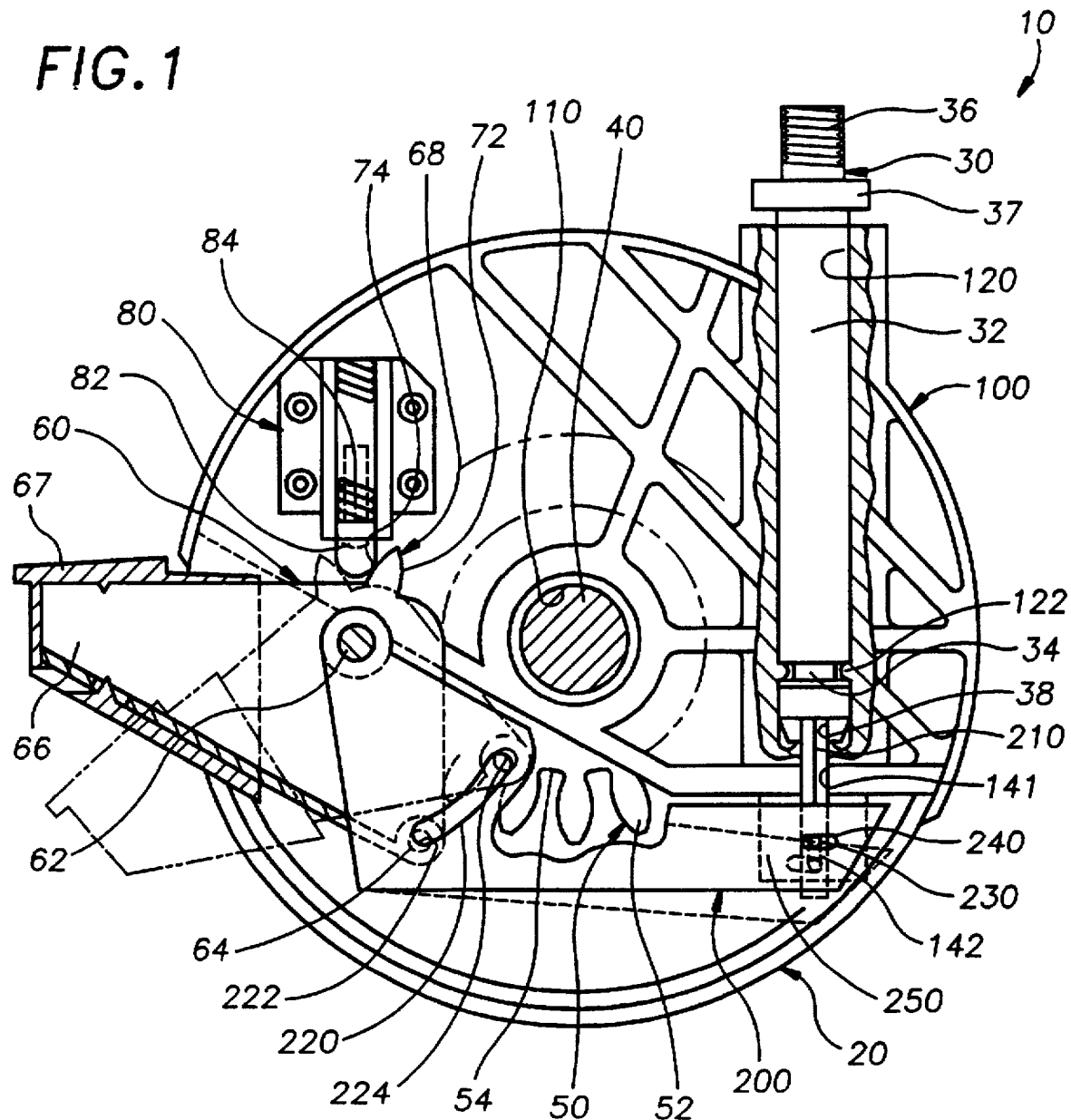
FIG. 1 is a partial sectional view of a total lock swivel caster according to an exemplary embodiment of the invention.

FIG. 1 is a partial sectional view of a total lock swivel caster assembly comprising generally a wheel 20 rotatably coupled to a housing 100, which is pivotally coupled to a mounting stem 30. The assembly includes a wheel brake for preventing wheel movement relative to the housing 100, and a swivel lock for preventing mounting stem movement relative to the housing 100. In the exemplary embodiment two separate wheels, each located on opposing sides of the housing 100, are rotatably coupled to the housing 100 by a common shaft or axle 40 disposed through a first bore 110 in the housing, wherein the mounting stem 30 is located substantially between the two wheels 20. For clarity, FIG. 1 shows only one wheel 20, which is partially eclipsed by the housing. The many aspects, features and advantages of the invention are, however, applicable to swivel casters having one or two wheels.

According to one aspect of the invention, a first end portion 32 of the mounting stem 30 is pivotally disposed in a second bore 120 of the housing 100, which is offset relative to the first bore 110 of the housing, or rotation axis of the wheel axle 40, to permit the wheel 20 to swivel about the pivoting axis of the mounting stem 30, which provides excellent maneuvering characteristics. The mounting stem 30 is retainable in the second bore 120 by a resilient protruding member 122 engageable with a mating recess 34 formed on the first end portion 32 of the mounting stem 30.

A second end portion 36 of the mounting stem 30 includes screw threads or other means for securely fastening the mounting stem 30 to an article, not shown, and may include a flange 37 for supporting the article. In one embodiment, the housing 100 is a unitary member formed of molded plastic material.

According to another aspect of the invention, the wheel 20, or at least one wheel in a two-wheel swivel caster assembly, includes a toothed cog 50 on an inner side of the wheel 20 facing the housing 100. FIG. 1 illustrates, behind a broken away portion of the drawing, a portion of a toothed cog 50 having teeth 52 separated by recesses 54 disposed concentrically about the axle 40. In one configuration, the toothed cog 50 is a unitary part of a molded wheel, and in another configuration the toothed cog 50 is a separate component that is assembled onto the inner side of the wheel 20 to form an integral part of the wheel 20. A brake lever bracket 60 is pivotally coupled to the housing 100 by a mounting member 62 and includes a brake pin 64 that protrudes from the brake lever bracket 60 toward the inner side of the wheel 20. In an embodiment including two wheels each having toothed cogs 50 on opposing sides of the housing 100, an end portion of the brake pin 64 protrudes laterally from opposing sides of the brake lever bracket 60 toward the inner sides of corresponding wheels 20 on opposing sides of the housing 100. An end portion 66 of the brake lever bracket 60 protrudes from the housing 100 on an opposing sides of the wheel axle 40 relative to the mounting stem 30. In one configuration, the brake lever bracket 60 is fabricated from a sheet metal material and includes a plastic or rubber boot or cover 67 disposed over the end portion 66 for improved gripping, usually by one's toe or foot.

The end portion 66 of the brake lever bracket 60 is pivotal downwardly and upwardly about the support member 62 to move the brake pin 64 upwardly and downwardly, respectively, by locating the brake pin 64 and end portion 66 on opposing sides of the support member 62. As the end portion 66 of the brake lever bracket 60 is moved downwardly, the brake pin 64 is moved upwardly into engagement with the toothed cog 50 of the wheel or wheels 20. In the exemplary embodiment, the upwardly pivoted brake pin 64 is engageable in a recess 54 between adjacent teeth 52 of the wheel or wheels 20 to prevent wheel movement, or rotation, relative to the housing 100. And as the end portion 66 is moved upwardly, the brake pin 64 is moved downwardly and disengaged from between the teeth 52 of the wheel or wheels 20 to permit wheel movement relative to the housing 100.

According to another aspect of the invention, the brake lever bracket 60 includes a cam member 68 with a first side 72 and a second side 74. A biasing member 80 is mounted on the housing 100 and is engageable with the cam member 68 to bias, or preload, the brake lever bracket 60 in either a fully upward position or a fully downward position. In the exemplary configuration, the biasing member 80 includes a curved tip portion 82 biased toward the brake lever bracket 60 and into engagement with the cam member 68 by a spring member 84. The curved tip portion 82 is engageable with the first side 72 of the cam member 68 to bias the brake lever bracket 60 in the downward position, which prevents wheel movement relative to the housing as discussed above. The curved tip portion 82 is also engageable with the second side 74 of the cam member 68 to bias the brake lever bracket 60 in the upward position, which permits wheel movement relative to the housing. According to a related aspect of the invention, the biasing member 80 is mounted on the housing 100 so that the biasing member 80 makes a transition between engagement with the first side 72 and the second side 74 of the cam member 68 approximately half-way along a travel arc subtended by the pivotal brake lever bracket 60. When the brake lever bracket 60 is pushed downwardly past the half-way position, the biasing member 80, which may be aided by an operator's downward force on the brake lever bracket 60, engages the first side 72 to snap and maintain the brake lever bracket 60 into the fully downward position wherein the wheel brake is engaged. When the brake lever bracket 60 is lifted upwardly past the half-way position, the biasing member 80, which again may be aided by an operator's upward force on the brake lever bracket 60, engages the second side 74 to snap and maintain the brake lever bracket 60 into the fully upward position wherein the wheel brake is disengaged.

According to another aspect of the invention, a swivel lever bracket 200 is pivotally coupled to the housing 100, and includes a keyed shaft 210 engageable with a keyed aperture 38 of the mounting stem 30 to prevent mounting stem movement relative to the housing 100. The brake pin 64 is engageable with the swivel lever bracket 200 to pivot the swivel lever bracket 200 causing the keyed shaft 210 to engage with the keyed aperture 38 of the mounting member 30 when the brake pin 64 is engaged with the toothed cog 50. The brake pin 64 is also engageable with the swivel lever bracket 200 to pivot the swivel lever bracket 200 causing the keyed shaft 210 to disengage from the keyed aperture 38 of the mounting stem 30 when the brake pin 64 is disengaged from the toothed cog 50. According to this aspect of the invention, pivoting the brake lever bracket 60 downwardly prevents wheel 20 movement relative to the housing 100 and also prevents swiveling action of the wheel 20 about the mounting stem 30 by preventing mounting stem movement relative to the housing 100.

In the exemplary embodiment, the brake lever bracket 60 and the swivel lever bracket 200 are pivotally coupled to the housing 100 by the common support member 62, and the brake pin 64 is disposed through and engageable with a slot 220 in the swivel lever bracket 200 to pivot the swivel lever bracket 200 for engaging and disengaging the keyed shaft 210 with the keyed aperture 38 of the mounting member 30 when the brake lever bracket 60 is pivoted downwardly and upwardly, respectively. The slot 220 is a substantially curved, or arc shaped, slot wherein the brake pin 64 extends through the slot 220 and toward the inner side of the wheel or wheels as discussed above. The slot length is dimensioned so that the brake pin 64 is movable through and along the slot and engageable with opposing end portions 222 and 224 of the slot 220 to pivot the swivel lever bracket 200 about the support member 62 for engaging and disengaging the keyed shaft 210 with the keyed aperture 38 of the mounting member 30. In one embodiment, the swivel lever bracket 200 is a substantially U-shaped member nested over the brake lever bracket 60, and the substantially curved slot 220 extends through opposing sides of the U-shaped member so that opposing ends of the brake pin 64 are extendable through corresponding curved shaped slots and toward the inner sides of the wheels.

According to another aspect of the invention, the keyed aperture 38 is disposable in the mounting stem 30 along a pivoting axis of the mounting stem 30, and the keyed shaft 210 is coupled to the swivel lever bracket 200 in alignment with the keyed aperture 38 along the pivoting axis of the mounting stem 30. According to this configuration, an end portion 250 of the swivel lever bracket 200 is disposed under the mounting stem 30 in the housing 100 and is movable toward and away from the mounting stem 30 when the swivel lever bracket 200 is pivoted by the brake pin 64 as discussed above. The keyed shaft 210 is coupled to the swivel lever bracket 200 by a roll pin 230 extended through a slot 240, which preferably extends through opposing sides of U-shaped swivel lever brackets, to permit movement of the swivel lever bracket 200 while maintaining the keyed shaft substantially along the pivoting axis of the mounting stem 30. A portion of the keyed shaft 210 is also movably disposed in and aligned by slots 142 formed in the housing 100 along the pivoting axis of the mounting stem 30. One or both end portions of the roll pin 230 extend through the swivel lever bracket 200 and protrude into slots 142 formed in portions of the housing 100, wherein the end portions of the roll pin 230 travel up and down along the slots 142 to prevent rotation of the keyed shaft 210 relative to the swivel lever bracket 200 thereby preventing movement, or rotation, of the mounting stem 30 when the keyed shaft 210 is engaged with the keyed aperture 38. The keyed shaft 210 is movable toward and away from the keyed aperture 38 when the swivel lever bracket 200 is pivoted about the support member 62 by the brake pin 64 for engaging and disengaging the keyed shaft 210 with the keyed aperture 38.

According to another aspect of the invention, the keyed shaft 210 and the keyed aperture 38 have complementary polygonal cross-sectional configurations, wherein the keyed shaft 210 is disposable in and engageable with the keyed aperture 38 to prevent mounting stem movement relative to the housing 100 when the swivel lever bracket 200 is pivoted by the brake lever bracket 60. In one configuration, the keyed shaft 210 has a six-sided, or hexagonal shaped, outer surface engageable with a keyed aperture 38 having a twelve sided inner surface. According to this configuration, the keyed shaft 210 is disposable in the keyed aperture 38 when corners of the six-sided keyed shaft are properly aligned with corners of the twelve-sided keyed aperture 38, which alignment occurs in thirty degree intervals, to engage and prevent rotation of the mounting stem 30. When the keyed shaft 210 is not aligned with the keyed aperture 38, the keyed shaft 210 is prevented from being disposed into the keyed aperture 38 and from preventing movement of the mounting stem 30 relative to the housing 100.

According to another aspect of the invention, the biasing member 80 operates to bias the keyed shaft 210 toward the keyed aperture 38 until the keyed shaft 210 is aligned with the keyed aperture 38 whereupon the keyed shaft 210 is disposed within and engaged with the keyed aperture 38 under the influence of the biasing member 80. According to this aspect of the invention, the slot 220 in the swivel lever bracket 200 permits the brake pin 64 to move upwardly as the brake lever bracket 60 is moved downwardly to an extent that the biasing member 80 is engageable with the first side 72 of the cam member 68. The biasing member 80 thus biases the brake pin 64 into engagement with the portion 224 of the slot 220 to pivot the swivel lever bracket 200 upwardly, and moves and biases the keyed shaft 210 toward the keyed aperture 38. If the keyed shaft 210 is not aligned with the keyed aperture 38, the keyed shaft 210 is biased into engagement with an end portion of the mounting member 30, but the keyed shaft is not disposed within the keyed aperture 38. As the mounting stem 30 is rotated relative to the keyed shaft 210 to align the six-sided keyed shaft 210 with the twelve-sided keyed aperture 38, the keyed shaft 210 is then disposed into the keyed aperture 38 under the influence of the biasing member 80 to prevent mounting stem movement relative to the housing 100. According to one embodiment, the brake pin 64 is engageable with the toothed cog 50 to prevent wheel 20 movement relative to the housing 100 whether or not the keyed shaft 210 is disposed in and engaged with the key aperture 38 to prevent mounting stem movement relative to the housing 100.

The biasing member 80 also operates to remove the keyed shaft 210 from the keyed aperture 38 when the brake lever bracket 60 is pivoted upwardly. According to this aspect of the invention, as the brake lever bracket 60 is pivoted upwardly, the brake pin 64 moves downwardly along the slot 220 of the swivel lever bracket 200 to an extent that the biasing member 80 engages the second side 74 of the cam member 68. The biasing member 80 thus biases the brake pin 64 into engagement with the portion 222 of the slot 220 to pivot the swivel lever bracket 200 downwardly and moves the keyed shaft 210 away from the keyed aperture 38 whereupon the keyed shaft 210 is withdrawn and disengaged from the keyed aperture 38 to permit mounting member 30 movement relative to the housing 100. According to the exemplary embodiment, the brake pin 64 is disengageable from the toothed cog 50 to permit wheel 20 movement relative to the housing 100 before the keyed shaft 210 is fully disengaged from the key aperture 38. More generally, however, the slot 220 may be configured on the swivel lever bracket 200 for simultaneous disengagement of the brake pin 64 from the toothed cog 50 and the keyed shaft 210 from the keyed aperture 38 by reducing the spacing between end portions 222 and 224 of the slot 220.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A swivel caster apparatus comprising:

a housing;

a wheel rotatably coupled to the housing, the wheel including a toothed cog on an inner side of the wheel;

a mounting stem pivotally coupled about a pivoting axis to the housing, the mounting stem having a keyed aperture;

a brake lever bracket pivotally coupled to the housing, the brake lever bracket including a brake pin engageable with the toothed cog to prevent wheel movement relative to the housing;

a swivel lever bracket pivotally coupled to the housing, the swivel lever bracket having a keyed shaft engageable with the keyed aperture of the mounting stem to prevent mounting stem movement relative to the housing, wherein the brake pin is engageable with the swivel lever bracket to pivot the swivel lever bracket to engage the keyed shaft with the keyed aperture when the brake pin is engaged with the toothed cog.

2. The apparatus of claim 1 wherein the brake pin is disposed through a slot in the swivel lever bracket, and the brake pin is engageable with the slot of the swivel lever bracket to pivot the swivel lever bracket to engage the keyed shaft with the keyed aperture when the brake pin is engaged with the toothed cog.

3. The apparatus of claim 1 wherein the keyed aperture is disposed in an end portion along the pivoting axis of the mounting stem, and wherein the keyed shaft is coupled to the swivel lever bracket and movable along the pivoting axis of the mounting stem into engagement with the keyed aperture when the brake pin is engaged with the toothed cog.

4. The apparatus of claim 1 wherein the housing includes a biasing member, and wherein the brake lever bracket includes a cam member with a first side and a second side, the biasing member engagable with the second side of the cam member for pivoting the brake lever bracket to disengage the brake pin from the toothed cog wherein the brake pin pivots the swivel lever bracket to disengage the keyed shaft from the keyed aperture, and the biasing member engagable with the first side of the cam member for pivoting the brake lever bracket to engage the brake pin with the toothed cog wherein the brake pin pivots the swivel lever bracket to engage the keyed shaft with the keyed aperture.

5. The apparatus of claim 4 wherein the biasing member includes a curved tip portion biased by a spring member toward the cam member of the brake lever bracket.

6. The apparatus of claim 1 wherein the swivel lever bracket is a substantially U-shaped member nested over the brake lever bracket, the swivel lever bracket and the brake lever bracket coupled to the housing by a common support member, the brake pin is engageable with a substantially curved slot in the swivel lever bracket, and the keyed shaft is coupled to an end portion of the swivel lever bracket by a roll pin disposed through slots arranged substantially perpendicular to a pivoting axis of the mounting stem on opposing sides of the U-shaped member.

7. The apparatus of claim 6 further comprising a second wheel rotatably coupled to the housing, the second wheel including a second toothed cog coupled to an inner side of the second wheel, and the brake pin engageable with the second toothed cog to prevent second wheel movement relative to the housing, wherein the substantially curved slot is disposed through opposing sides of the U-shaped member, and the brake pin is disposed through the substantially curved slot on opposing sides of the swivel lever bracket.

8. A method for locking a swivel caster apparatus having at least one wheel rotatably coupled to a housing and a mounting stem pivotally coupled about a pivoting axis to the housing, the method comprising steps of:

pivoting a brake lever bracket pivotally coupled to the housing;

engaging a pin of the brake lever bracket with a toothed cog disposed on an inner side of the wheel to prevent wheel rotation relative to the housing;

pivoting a swivel lever bracket, pivotally coupled to the housing, by engaging the brake pin with the swivel lever bracket when the brake pin is engaged with the toothed cog; and engaging a keyed shaft with a keyed aperture of the mounting stem to prevent mounting stem movement relative to the housing when the brake pin is engaged with the toothed cog.

9. The method of claim 8 wherein the keyed aperture is disposed in an end portion along a pivoting axis of the mounting stem and the keyed shaft is coupled to the swivel lever bracket, the method further comprising steps of moving the keyed shaft along the axis of the mounting stem and into engagement with the keyed aperture when the brake pin is engaged with the toothed cog.

10. The method of claim 8 wherein the housing includes a biasing member, and wherein the brake lever bracket includes a cam member with a first side and a second side, the method further comprising steps of:

engaging the biasing member with the second side of the cam member for pivoting the brake lever bracket to disengage the brake pin from the toothed cog and to pivot the swivel lever bracket to disengage the keyed shaft from the keyed aperture; and engaging the biasing member with the first side of the cam member for pivoting the brake lever bracket to engage the brake pin with the toothed cog and to pivot the swivel lever bracket to engage the keyed shaft with the keyed aperture.

* * * * *